(No Model.) 4 Sheets—Sheet 1.
F. H. BASSETT.
BICYCLE.
No. 602,536. Patented Apr. 19, 1898.
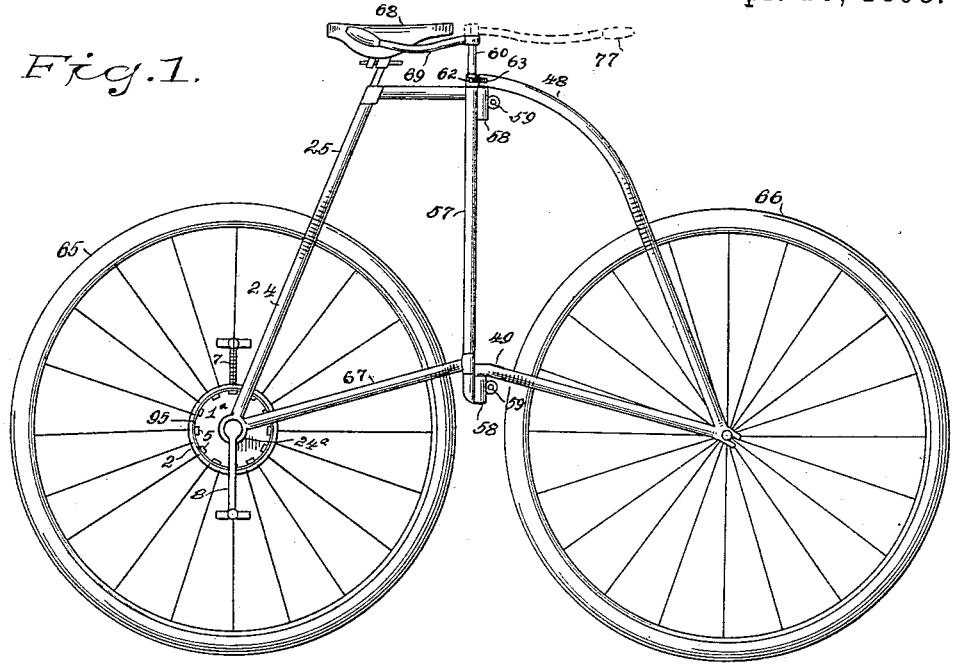
Fig. 1.
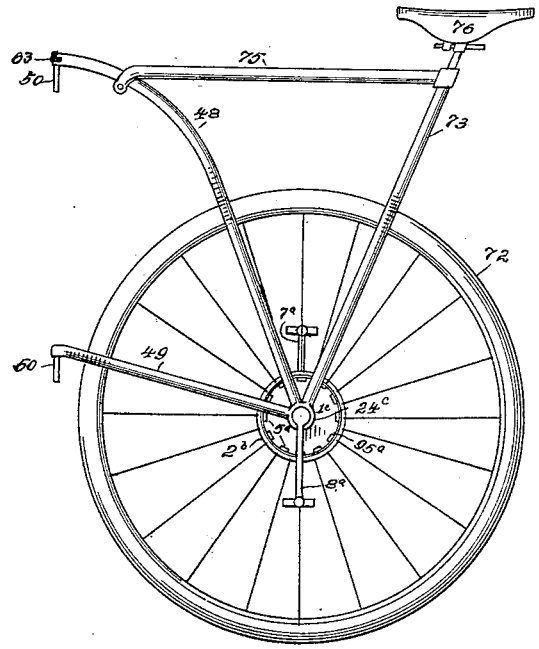
Fig. 2.
Fig. 19.
Fig. 3.
WITNESSES
H. A. Lamb
M. J. Keane
INVENTOR
Fred H. Bassett
by Geo. D. Phillips
his Atty.

(No Model.) 4 Sheets—Sheet 2.
F. H. BASSETT.
BICYCLE.
No. 602,536. Patented Apr. 19, 1898.
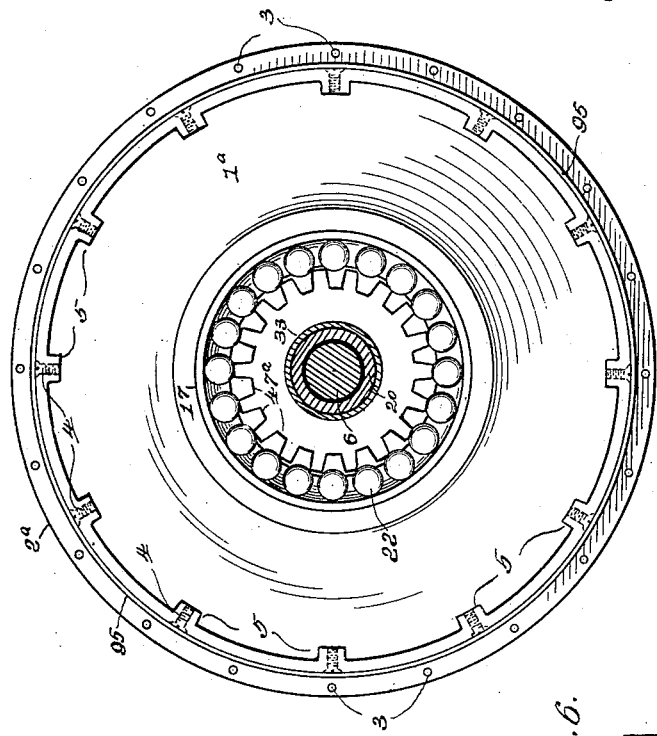
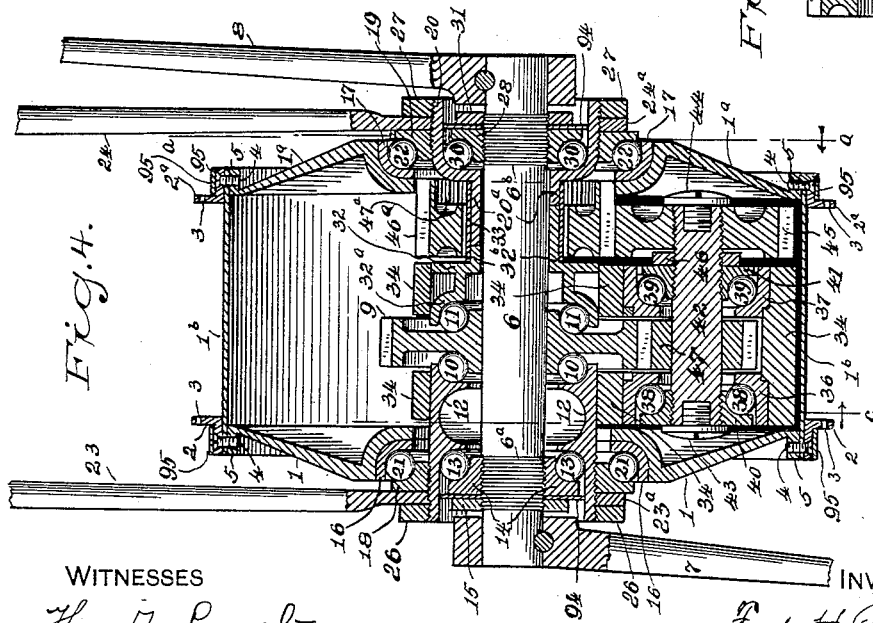
WITNESSES
H. A. Lamb
M. J. Keane
INVENTOR
Fred H. Bassett,
by Geo. O. Phillips.
his Atty.

(No Model.) 4 Sheets—Sheet 3.
F. H. BASSETT.
BICYCLE.
No. 602,536. Patented Apr. 19, 1898.
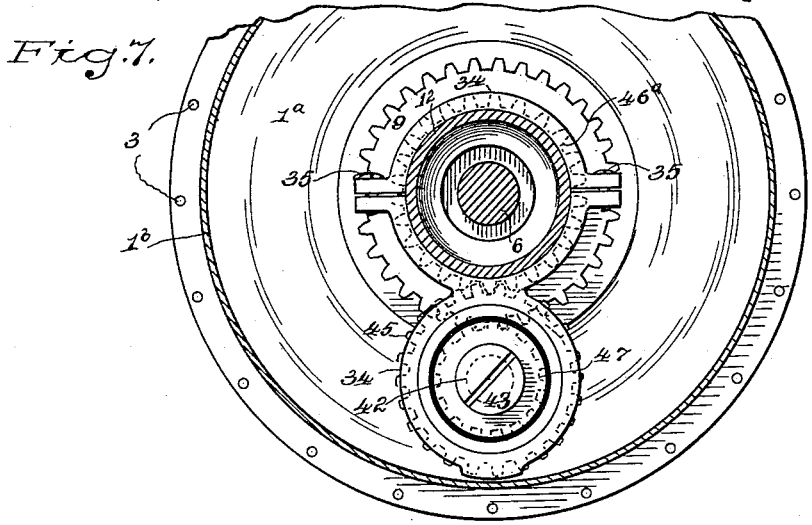
Fig. 7.
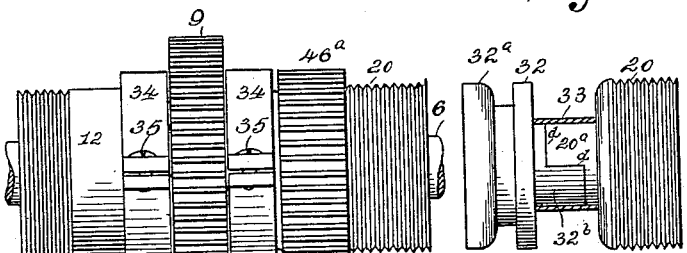
Fig. 8.
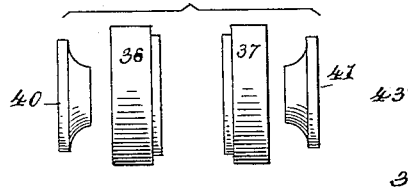
Fig. 9.
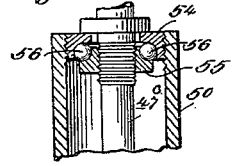
Fig. 10.
Fig. 11.
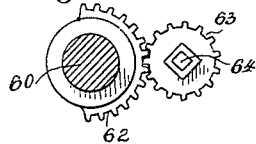
Fig. 13.
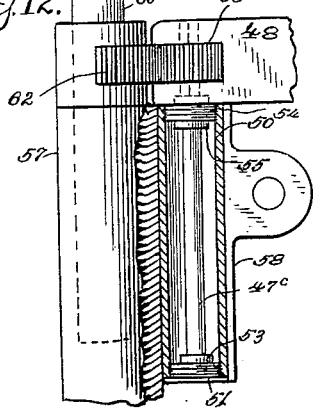
Fig. 12.
WITNESSES
H. A. Lamb
M. J. Keane
INVENTOR
Fred H. Bassett.
by Geo. D. Phillips.
his Atty.

(No Model.) 4 Sheets—Sheet 4.

F. H. BASSETT.
BICYCLE.

No. 602,536. Patented Apr. 19, 1898.

WITNESSES
H. A. Lamb
M. J. Keane

INVENTOR
Fred H. Bassett.
by Geo. D. Phillips.
his Atty.

UNITED STATES PATENT OFFICE.

FRED H. BASSETT, OF WATERBURY, CONNECTICUT.

BICYCLE.

SPECIFICATION forming part of Letters Patent No. 602,536, dated April 19, 1898.

Application filed December 16, 1896. Serial No. 615,851. (No model.)

*To all whom it may concern:*

Be it known that I, FRED H. BASSETT, a citizen of the United States, and a resident of Waterbury, in the county of New Haven and State of Connecticut, have invented certain new and useful Improvements in Bicycles, of which the following is a specification.

My invention relates to an improvement in bicycles and vehicles of like character; and it consists in certain features of construction, to be more fully described in the following specification.

To enable others to understand my invention, reference is had to the accompanying drawings, in which—

Figure 14:
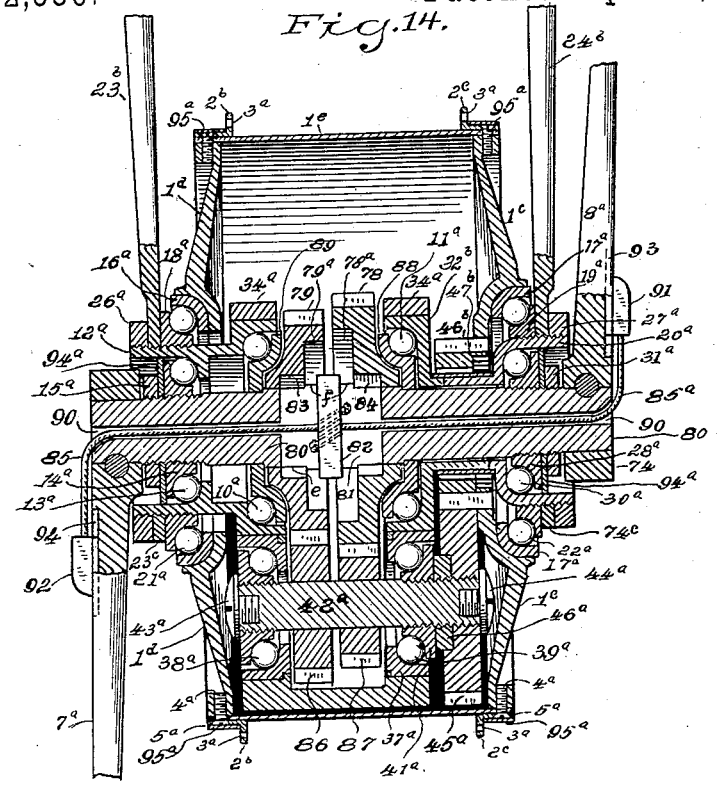
Figure 15:
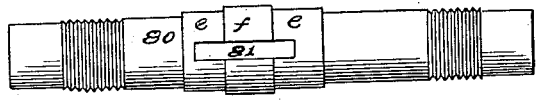
Figure 17:
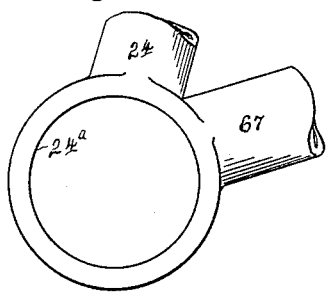
Figure 16:
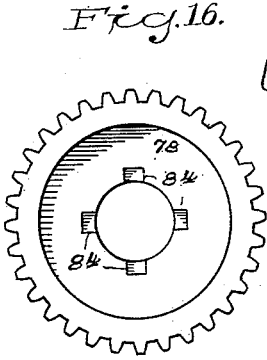
Figure 18:
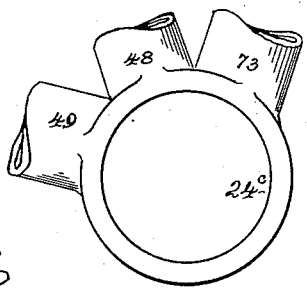

Figure 1 represents a side elevation of my improved construction, showing the driving-gear mechanism located within the wheel-hub about the axle of the forward wheel and the steering-post located in rear of the seat, so as to operate or turn the rear wheel in place of the front wheel, as heretofore. Fig. 2 is a side elevation of a tandem-wheel to be used in place of the detachable rear wheel shown at Fig. 1 whenever required to convert the machine into a tandem, which rear wheel is also provided with the same driving mechanism as the front wheel, also having a portion of a frame and a seat connected thereto. Fig. 3 is a detail view of handle-bar to be used when the machine is converted into a tandem. Fig. 4 is a detail central sectional view of the driving mechanism and driving-wheel hub enveloping the same and broken view of the fork and pedal-cranks. Fig. 5 is a detail side elevation of the driving-wheel hub, sectional view of the crank-shaft and ball-bearing-casing hub, showing a series of balls in the bearing of the wheel-hub and the internal teeth of said hub. Fig. 6 is a detail central sectional end elevation of the hub driving-gear. Fig. 7 is a detail broken sectional view of the driving-wheel hub, ball-casing, and crank-shaft, side elevation of the yoke that embraces the ball-bearing casing, and pinion-shaft casing through line c of Fig. 4. Fig. 8 is a detail upper plan view of the yoke and ball-casing surrounding the crank-shaft and the ball-bearing casing of the pinion-shaft, also view of the crank-shaft and its pinion, intermediate gear, and the gear that engages to communicate motion to the wheel-hub gear. Fig. 9 is a detail view of the ball-bearing casings of the pinion-shafts and their ball-bearing cones. Fig. 10 is a detail view of one of the ball-bearing casings of the crank-shaft. Fig. 11 is a detail broken view, partly in section, of one of the ball-bearing connections of the rear-wheel frame. Fig. 12 is a detail broken view of the steering post and head, rear-wheel frame, segment-gear, and pinion for steering the rear wheel and sectional view of the ball-bearing connection. Fig. 13 is a detail plan view of the segment-gear adapted to be attached to the machine-head and the driving-pinion adapted to be connected with the upper part of the rear frame and section of the post. Fig. 14 is a detail sectional view of driving mechanism and driving-wheel hub similar to the view shown at Fig. 4, with the additional feature of a double driving-gear for different speeds. Fig. 15 is a detail view of the crank-shaft adapted for the variable-speed mechanism shown at Fig. 14. Fig. 16 is a side elevation of one of the variable-speed driving-gears. Fig. 17 is a detail side elevation of one of the fork connections of the construction shown at Fig. 1 and broken view of the bicycle-frame. Fig. 18 is a detail side elevation of one of the fork connections of the construction shown at Fig. 2 and broken view of the bicycle-frame. Fig. 19 is a detail upper plan view of the bicycle head and clamp for the rear-wheel frame.

Its construction and operation are as follows:

The gear mechanism for driving the bicycle is located at the center of the wheel and is all embraced in the drum or hub shown at Figs. 1, 2, 4, 5, and 7, reference being had to Fig. 4 for a better detailed description of the internal mechanism of the said hub. 1 1$^a$ constitute the sides of said hub, while the band 1$^b$ spans the space between such sides to form a close drum-like construction.

2 2$^a$ are the spoke-rings that embrace the wheel-hub, having holes 3 therethrough for the spokes. These rings, together with the band or periphery 1$^b$, (see also Fig. 5,) are held firmly to the sides of the hub by the screws 4, which screws are inserted in threaded holes of the lugs 5 of the sides 1 and 1$^a$.

6 is the crank-shaft, having on its outer projecting ends the pedal-cranks 7 and 8.

9 is a driving-gear rigidly attached to the central portion of the shaft 6, and around the hub on each side of said gear are two semicircular grooves to serve as raceways or ball-bearings, and 10 and 11 are four of a series of such balls.

12 is a ball-bearing casing which embraces the crank-shaft, but does not, however, come in contact with it. The inner end of this casing has a semicircular groove that engages with the balls 10 of the said driving-gear. The outer end or mouth of this casing is also provided with a semicircular groove that forms a seat for the balls 13.

14 is a ball-bearing cone having a threaded interior to engage with the threaded portion $6^a$ of the crank-shaft, whereby such cone is adjusted with respect to the balls 13, and 15 is a threaded nut mounted on the said crank-shaft to adjust said cone.

16 and 17 are semicircular ball-bearing casings placed in semicircular grooves in the outer faces of the sides 1 and $1^a$ of the hub.

18 and 19 are ball-bearing cones adapted to embrace the outer threaded ends of the ball-casings 12 and 20. (See Fig. 8 for a full view of said casings, whereby the necessary adjustment for such cones with respect to balls 21 and 22 is effected.)

23 and 24 are the legs of a fork, which fork is a continuation of the saddle-supporting upright 25. (Seen at Fig. 1.) The lower ends of these legs are provided with rings $23^a$ and $24^a$, one of which rings is shown at Fig. 17. These rings embrace the outer ends of the ball-casings 12 and 20, and they are held firmly against the cones 18 and 19 by means of the threaded nuts 26 and 27, and this arrangement also secures the legs of the fork firmly to the ball-casings 12 and 20.

28 is a ball-bearing cone mounted on the threaded portion $6^b$ of the shaft, similar in every respect to the cone 14, which cone engages with the balls 30, whose seat or bearing is within the mouth of the ball-casing 20. 31 is the adjusting-nut for such cone, and such nut is also mounted on the threaded portion $6^b$ of the crank-shaft 6.

32 is a ball-bearing casing, which casing has the curved end $32^a$, whose mouth serves as a cone-bearing for the balls 11 of the driving-gear 9.

The casings 20 and 32 (see also Fig. 10) have the hub portions $20^a$ and $32^b$ so formed as to interlock into each other, as shown by the meeting lines $d$, whereby the casing 20 can be removed without disturbing the casing 32. 33 is a band or sleeve that encircles these hubs, which band is shown in section. It will be understood, however, that neither the casing 12, 20, or 32 while encircling the crank-shaft come in contact therewith, as nothing but the pedal-cranks, cones 14 and 28, and their adjusting-nuts 15 and 31, and also the driving-gear 9 are the only parts of the mechanism that come in contact with the crank-shaft.

34 (see also Figs. 7 and 8) is a yoke firmly embracing the outer surface of the casings 12 and 20, and it is clamped thereto by means of the screws 35. Thus the said yoke is firmly anchored to a fixed and stationary point for the purpose hereinafter to be more fully described.

36 and 37 (see also Fig. 9) are ball-bearing casings which are inserted within the smaller portion of the yoke 34 to provide seats for the balls 38 and 39.

40 and 41 are ball-bearing cones mounted upon the threaded portion of the shaft 42. 43 and 44 are screws inserted in threaded holes in the ends of said shaft. The head of one of such screws engages with the outer surface of the cone 40 for the purpose of holding such cone in place, while the head of the other screw engages with the outer face of the gear 45, mounted upon the outer projecting end of the pinion-shaft 42.

46 is a threaded nut mounted upon the shaft 42 and bearing against the cone 41 for the purpose of adjusting such cone.

47 is a pinion rigidly mounted on the shaft 42, which pinion registers with the driving-gear 9.

The gear 45 on the end of the shaft 42 registers with the gear $46^a$, which gear embraces but does not come in contact with the band 33 around the hubs of the ball-bearing casings 20 and 32. The teeth of the gear $46^a$ (see also Fig. 6) project on one side, so as to register with the internal teeth $47^a$, Fig. 5, of the hub side plate $1^a$. When, therefore, power is applied to the pedal-cranks, the crank-shaft is rotated, together with the driving-gear 9, transmitting motion and power to the pinion 47, thence through its shaft 42 to the gear 45, and from thence to the hub-gear $46^a$, turning such hub and wheel attached thereto, while the yoke, with the several ball-bearing casings located therein, will remain perfectly stationary.

$47^c$ (see Figs. 11 and 12) is a stud projecting downward from the top rail 48 (see also Figs. 1 and 2) and the bottom rail 49 of the rear detachable frame and is surrounded by the rotatable shell 50. It will be understood that as the ball-bearing connections of the top rail 48 and the bottom rail 49 are exactly alike the same figures of reference will be used. At the bottom of the shell 50 is placed the ball-bearing case 51, carrying the balls 52, and mounted upon a threaded portion of the stud $47^c$ is the cone 53, adapted to be adjusted on said stud with respect to the said balls. In the mouth of the said shell is placed the ball-bearing casing 54, while the cone 55 is adjustably placed on a threaded portion of the stud $47^c$, while the balls 56 are located between said cone and casing. This construction just described forms a permanent attachment of the rear-wheel frame, and such frame is connected to the upright or head 57, Fig. 1, as follows: 58 are sockets integral with such head, and they are located one at the top and the other at the bottom. (See also Fig. 19.) The shells 50 of the ball-bearing connection of the frames are inserted in the said sockets and are firmly secured therein by means of the bolt 59. The steering-post 60 is placed in the hole 61 of the said head. On this steering-post (see also Fig. 13) is the segment-gear 62, which gear registers with the pinion 63, located in a forked opening of the rail 48. The said pinion is provided with the square central hole 64 to engage with a squared portion of the shank of the upper ball-bearing stud $47^c$.

When the machine is used for one person only, it will be provided with the front wheel 65, whose driving mechanism is located in the hub of such wheel, the operations of which have already been fully described, in which case the rear wheel 66 will simply be provided with an ordinary hub, to which hub the forked connections of the rails 48 and 49 are attached, 67 being a similar fork embracing the front wheel and is connected to the upright or head 57. The seat 68 is situated over the front wheel instead of the rear wheel, and the steering post and head are at the rider's back, while the handle-bars 69 project forward on each side of the saddle and within easy reach of the rider, thus leaving the front clear, open, and unobstructed. This arrangement of the steering-post gives the rider full control of the rear wheel, which wheel is the one that is manipulated to steer the machine instead of the front wheel, thereby relieving the rider of that constant care and watchfulness necessary in controlling the front wheel when such wheel is used to steer with, as it is so extremely sensitive in its operation that the slightest obstruction will throw the machine out of balance unless the handle-bars are firmly grasped.

In my improvement the front wheel is a fixture, and it will not swerve from any given direction, and the rear wheel will simply track behind, so that the rider can let go of the handle-bars and ride with perfect safety and guide the machine by a slight motion of the body much easier than it can now be done with the present construction of bicycles, and when necessary to change the direct course it can be done by means of the rear wheel.

When required to convert the single machine into a tandem, the rear wheel 66, together with its frame, is removed, and the wheel 72, Fig. 2, with its frame, is pivotally attached to the upright or head 57 in precisely the same manner. This rear wheel is provided with a driving mechanism similar to the one shown in the front wheel and is operated in the same manner. In this case there are three forked rails or braces—viz., 48, 49, and 73—that unite with the rings that embrace each end of the ball-bearing casings, one of which rings, $24^c$, is shown at Fig. 18. 75 is a top rail connecting the two uprights 48 and 73. The saddle 76 for the rear rider is mounted in the said upright 73. The handle-bars 77 (shown at Fig. 3) are placed above the handle-bars for the forward rider and project rearward, as shown by their dotted position at Fig. 1.

In Fig. 14 is shown a propelling mechanism similar to that shown at Fig. 4, except that this construction is intended for transmitting different speeds. In this arrangement there are two driving-gears 78 and 79, which gears are loosely mounted upon the enlarged portion $e$ of the crank-shaft 80, Fig. 15. The inner faces of these gears are set back by the recesses $78^a$ and $79^a$, and such faces are brought against the sides of enlarged portion $f$ of such shaft.

81 is an elongated slot extending through the shaft 80 to receive the driver 82, which driver is adapted to be operated in such slot. In each of the inner faces of the said driving-gears are the recesses 83 and 84 (see also Fig. 16) to receive the projecting end of said driver when moved along the slot 81 of the crank-shaft by means of the wire ropes 85 $85^a$, presently to be more fully explained.

86 is a pinion registering with the driving-gear 79, which pinion is mounted on the shaft $42^a$, and 87 is the pinion which registers with the driving-gear 78.

$45^a$ is the gear that registers with the gear $46^b$, which in turn registers with the internal teeth of the hub $1^c$, similar to the arrangement shown in the single-speed construction at Fig. 4.

In the double-speed construction such parts as are substantially like the single-speed construction shown at Fig. 4 will be designated by the same figures of reference, primed by different letters as a distinguishing feature between the two. In this double-speed construction there are two extra ball-bearing casings 88 and 89, which casings take the place of the ball-bearings provided on the single driving-gear 9 of the single-speed construction shown at Fig. 4.

The wire ropes 85 and $85^a$ extend loosely through the central hole 90 of the crank-shaft and have their inner ends attached to the driver 82, while the outer ends of such wires extend without the shaft and are connected to the shoes 91 and 92, adjustably mounted in the slots 93 and 94, formed in the face of the pedal-cranks $7^a$ and $8^a$. In the drawings the driver 82 is placed midway between the two driving-gears, but its normal position will in most cases be in contact with one or the other of said gears. The larger driving-gear 78 is intended for speed, while the smaller driving-gear 79 is intended for hill-climbing. When, therefore, it is desired to change from one to the other of the said gears, the rider's foot is placed on one or the other of the two shoes 91 or 92 while the pedal is down and moves the driver in either of the slots 93 or 94, as the case may be.

$94^a$ represents dust-proof washers inserted in the mouth of the ball-bearing casings.

95 and $95^a$ are bands placed around the periphery of the hub to prevent the screws 4 working out.

The construction as above described has many advantages over the present devices now in use. The power is applied directly to the center of the wheel and transmitted thereto without loss. The novel features connected with the management of the machine are such that it is always under the rider's complete control. The arrangement shown for connecting the rear wheel to the machine enables it to be readily converted from a single machine to a tandem, so that by simply possessing a separate wheel one can have all the advantages of two machines at a small extra expense.

I wish it distinctly understood that many minor features of the construction shown may be changed or modified without departing from the spirit of my invention—such, for instance, as the manner of connecting the last gear of the train with the hub—as all that is required is to make a firm and rigid connection between the two; also, the form or number of the casings that surround the crank-shaft or the exact position or arrangement of the balls located between the casing and crank-shaft; also, that the exact form of the hub need not be followed. While I show the yoke rigidly secured to the casings, it will be understood that said yoke may be integral with such casings.

Having thus described my invention, what I claim as new, and desire to secure by Letters Patent, is—

1. The combination, in a bicycle having the crank-shaft centrally located with respect to the wheel, a driving-gear on said shaft, a ball-bearing rotatable hub surrounding the internal propelling mechanism, ball-bearing casings embracing said crank-shaft but not in contact therewith, and situated one on each side of said driving-gear, the projecting ends of which casings are supported to the forks of the bicycle, of a non-rotatable yoke-like structure rigidly embracing the inner ends of said casings so as to bind them together, the projecting part of said yoke carrying a pinion-shaft and ball-bearing casings, adjustable ball-bearing cones on said shaft, pinions on said shaft, one of which engages the driving-gear of the main shaft, while the other of said pinions engages a gear secured to the said rotatable hub, the casing on one side of the crank-shaft driving-gear being in two parts and interlocked so that the outer part may be removed without disturbing the inner part, a retaining-band embracing the hub portion of said divided casing, substantially as set forth.

2. The combination, in a bicycle having the crank-shaft centrally located with respect to the wheel, a driving-gear on said shaft, a ball-bearing rotatable hub surrounding the internal propelling mechanism, ball-bearing casings embracing said crank-shaft but not in contact therewith and situated on each side of the driving-gear, the projecting ends of which casings are supported to the forks of the bicycle, of a non-rotatable yoke binding said casings together, a projecting part of said yoke carrying a pinion-shaft and ball-bearing mechanism, adjustable ball-bearing cones on said pinion-shaft, pinions on said shaft, one of which engages the driving-gear of the main shaft, while the other of said pinions engages a gear secured to the said rotatable hub, substantially as set forth.

3. An improvement in bicycles having the motive power—comprising a crank-shaft and driving-gear—located at the center of the wheel, and a rotatable hub surrounding said propelling mechanism, of a casing surrounding said crank-shaft on one side of the driving-gear, ball-bearings between the inner end of said casing and the hub of said driving-gear, a two-part casing having interlocking hubs on the opposite side of said driving-gear with ball-bearing connection between the mouth of one of said casings and the hub of said gear, a band embracing said casing-hubs, to preserve their alinement, a yoke rigidly embracing the inner ends of the casings on each side of said gear, the outer projecting portion of said yoke carrying a ball-bearing pinion-shaft carrying pinions, one of which registers with the said driving-gear of the crank-shaft while the other of said pinions registers with a gear secured to the said rotatable hub, substantially as described and for the purpose set forth.

Signed at Bridgeport, in the county of Fairfield and State of Connecticut, this 7th day of December, A. D. 1896.

FRED H. BASSETT.

Witnesses:
ROBT. F. WEIR,
LEWIS F. PELTON.